United States Patent [19]

Lindgren, Sr. et al.

[11] Patent Number: 4,850,837
[45] Date of Patent: Jul. 25, 1989

[54] CHEESE EXTRUSION DEVICE

[76] Inventors: Donald R. Lindgren, Sr., 1869 E. Shore Dr., Green Bay, Wis. 54302; Donald S. Lindgren, Jr., 1035 S. Webster, Green Bay, Wis. 54301

[21] Appl. No.: 246,329

[22] Filed: Sep. 19, 1988

[51] Int. Cl.[4] ............ B29C 33/34; B29C 43/04; B29C 43/34; B29C 43/50

[52] U.S. Cl. ............................ 425/84; 99/452; 425/308; 425/310; 425/412; 425/422; 425/437; 425/444

[58] Field of Search ............... 99/452, 460, 456, 461, 99/462, 452 X; 425/85, 86, 259, 261, 542, 554, 556, 564, 565, 566, 575, 581, 585, 588, 586, 587, 558, 559, 560, 561, 562, 260, 406, 412, 415, 422, 444, 84; 426/512; 249/160, 161

[56] References Cited

U.S. PATENT DOCUMENTS

| | | | |
|---|---|---|---|
| 3,080,610 | 3/1963 | Baigent | 425/587 |
| 3,191,233 | 6/1965 | Linderoth | 425/587 |
| 3,468,026 | 9/1969 | Robertson et al. | 99/454 |
| 3,990,996 | 6/1976 | Balevski et al. | 425/560 |
| 4,061,794 | 12/1977 | Charles | 99/454 |
| 4,137,836 | 2/1979 | Megard | 99/456 |
| 4,152,101 | 5/1979 | Charles | 99/85 |
| 4,317,649 | 3/1982 | Boellmann | 425/150 |
| 4,339,468 | 7/1982 | Kielsmeier | 426/582 |
| 4,420,296 | 12/1983 | Anderson | 99/452 |
| 4,539,902 | 9/1985 | Brockwell et al. | 99/454 |
| 4,613,294 | 9/1986 | Rose et al. | 425/438 |
| 4,616,988 | 10/1986 | Muzzarelli | 425/150 |
| 4,646,602 | 3/1987 | Bleick | 83/437 |
| 4,685,877 | 8/1987 | Harada | 99/461 |
| 4,738,863 | 4/1988 | Lindgren | 426/582 |

Primary Examiner—Willard Hoag
Attorney, Agent, or Firm—Recka, Joannes & Faller

[57] ABSTRACT

A device for extruding cheese pieces; warm plastic cheese is extruded into a bore; a piston seals one end of the bore and a cheese working plate seals the other end; a mold is positioned below the bore, the mold top in sliding engagement with the cheese working plate, the mold bottom in sliding engagement with a mold support plate; holes in the cheese working plate, in the mold and in the support plate, align with the bore; the piston is forced through the bore, forcing the cheese in the bore, at high pressure, through the holes in the working plate, filling the mold holes with cheese; when the mold holes have filled, continued pressure by the piston forces a small amount of cheese out of the mold holes into small weeper holes; the piston is withdrawn to the top of the bore and the bore refilled with cheese; the filled mold is reciprocated under an ejector which forces the formed pieces out of the mold, into moving brine; in the best method, two molds are reciprocated between two bores and a single centrally mounted ejector.

6 Claims, 5 Drawing Sheets

CHEESE EXTRUSION DEVICE

FIELD OF THE INVENTION

The invention is a cheese extruding machine for forming pieces of cheese weighing less than one kilogram.

RELATED ART

Petitioners invention is used to make pieces of cheese of uniform density and of exact weights and dimensions, at high speed, from a source of warm plastic cheese. The cheese pieces formed, retain a skin which is formed on the cheese piece as it is cooled. The internal structure of the cheese piece formed can be controlled to causing stringing of the cheese piece.

The device was designed for forming pieces of cheese, such as pieces of cheddar cheese, as well as pieces of Italian type cheeses including mozzarella, provolone or scamorza.

In prior art devices, warm plastic cheese is extruded into a stainless mold. A 40 pound block is commonly formed in the mold. The mold is chilled, forming a skin on the cheese block. The skin helps hold the shape of the block when the block is ejected from the mold. Such a device is shown in U.S. Pat. No. 4,613,294. The block of cheese formed is then placed in a brining tank or trough.

After the cheese block has been brined, the cheese block can be cut into smaller rectangular pieces by a harp. Such a harp can be seen in U.S. Pat. No. 4,646,602.

Pieces of cheese that have been cut by a harp cannot be bent without cracking. Cutting smaller cheese pieces from a large cheese block produces a cheese piece that does not have the skin formed on the block when it is cooled.

The skin, formed on the cheese, during the forming process, has useful properties. A piece of cheese retaining the skin can be bent without cracking. It is an object of this invention to make small pieces of cheese retaining the skin formed in cooling.

The density of the cheese, in 40 pound blocks, and in cheese blocks formed directly from the output of a screw extruder, varies for various reasons, including extruder screw slippage. As the screws in the extruder slip, cheese consistency, in the cheese column output from the extruder, varies.

Brining time required of cheese is a function of the size of the cheese block to be brined. A small piece of cheese may be brined in several minutes. A 40 pound block of cheese may require 24 hours of brining. Brining the cheese, chills, salts, hardens and flavors the cheese. It is an object of this invention to make small pieces of cheese, i.e. under a kilogram, and to brine the cheese piece after formation, to lessen brining time.

Small pieces of cheese may be formed, by using an extrusion process, as an alternative to using a harp. In such a process, a screw extruder is used to force a column or rope of cheese out of an extrusion hole, into a brining tank. The ropes, after brining, are then cut to desired sizes.

While the extrusion system retains the useful skin on all but the cut ends of the pieces formed, shapes that can be extruded are limited. As the cheese is extruded out of the high pressure extruder, into the atmospheric pressure brining tank, the cheese expands unpredictably and takes on irregular shapes. Density of the extruded cheese rope formed by the extruder varies with slippage of the screw extruder. The cheese rope must be cut after extrusion. It is difficult to cut the cheese ropes formed to exact weight.

Pieces of cheese of constant density, with the desired skin formed in cooling, can be made by the device shown in U.S. Pat. No. 4,738,863. In that device, the output of the screw extruder is used to fill a mold, that mold is then moved over a second extrusion mold and the contents of the first mold are forced under great pressure into the extrusion mold, by a hydraulic cylinder.

The extrusion mold is then moved under an ejector and the formed pieces are ejected over a brine trough.

SUMMARY OF THE INVENTION

The invention comprises a bore, having a plunger at one end, a cheese texturing plate at the other end and a slidably mounted extrusion mold under the texturing plate.

The bore is filled with warm plastic cheese, the output from a cheese extruder. An extrusion mold, having cheese piece forming holes in it, is placed in sliding engagement with the cheese texturing plate bearing on top of the mold, and in sliding engagement with a support plate having weeper or small flush holes formed in it, under the mold. Holes in the texturing plate and in the support plate line up with the mold holes.

When the bore has been filled, the piston is forced through the bore, forcing the cheese out of the bore, through the holes in the cheese texturing plate, at high pressure, into the extrusion mold.

When the extrusion mold is filled, the piston is disengaged, returned to its fill position and the mold is moved out from under the texturing plate to a position under an ejector, where the pieces formed in the mold are ejected out of the mold, into a brining trough.

Two bores mounted on either side of a single centrally mounted ejector are shown in the best method.

It is an object of the invention to create a cheese piece forming device that can be easily disassembled into its cheese contacting component parts for cleaning, so that U.S.D.A. approval can be obtained for the device.

It is an object of the invention to produce a cheese piece that strings.

It is an object of the invention to increase the speed of production of cheese pieces by limiting the number of reciprocating elements.

It is an object of the invention to limit the number of sliding surfaces and openings through which cheese can be incidently extruded out of the device when pressure is put on the cheese in the bore. To that object an internal valve isolating the extruder from the bore was developed.

It is an object of the invention to eject at the center of the device, using a single centrally located ejection station, mounted normal to the plane of movement of the reciprocating mold frame.

It is an object of the invention to fill the extrusion mold at the same location that the output of the extruder is loaded into the bore. It is an object of the invention to isolate the output of the extruder from the forming station bore by means of valves, rather than to move the load to be extruded into the mold to a separate station to be loaded into the extrusion mold.

| FRAME COMPONENTS | |
| --- | --- |
| Forming Device | 100 |
| Frame | 102 |
| Frame saddle | 104 |
| Wheeled base | 106 |
| fillets | 108 |
| wheels | 110 |
| frame flat left | 112 |
| frame flat right | 114 |
| locator pins | 116 |
| locator pin, larger diameter part | 118 |
| locator pin, smaller diameter part | 120 |
| locator pin threads | 122 |
| wing nuts | 124 |
| frame saddle cleaning openings | 126, 128 |
| hydraulic cylinder support legs | 130 |
| hydraulic cylinder support leg cut out to show locator pin | 131 |
| hydraulic cylinder housings | 132, 134 |
| adjustable supports | 136, 138 |
| debris ejection holes | 140 |
| COMPONENTS ASSOCIATED WITH RECIPROCATING FRAME | |
| mold frame | 200 |
| mold frame supports | 202 |
| extrusion molds | 204 |
| extrusion mold cheese piece forming holes | 205 |
| mold blanks | 206 |
| mold frame hydraulic drive cylinders | 208 |
| hydraulic cylinder clevis (section of clevis) | 210 |
| STATIONARY MEMBERS | |
| Height Adjustment Block | 300 |
| Height Adjustment Block locator holes | 302 |
| Height adjustment block debris ejection holes | 304 |
| support plates which support sliding mold | 306 and 307 |
| weeper holes | 308 |
| center cut out for ejection of cheese pieces | 309 |
| fixed cheese texturing plate | 310 |
| fixed cheese texturing plate holes through which cheese is formed | 312 |
| FORMING STATIONS | |
| Forming stations | 400 and 402 |
| cheese entrance opening | 404 |
| cheese extruder | 406 |
| piston or plunger | 408 and 409 |
| piston ring | 410 and 411 |
| forming station hydraulic cylinders | 412 and 414 |
| forming station water jacket | 416 |
| source for hot water | 417 |
| forming station base flange | 418 |
| outside walls of forming station | 420 |
| inside walls or bore of forming station | 422 |
| Y shaped separator | 426 |
| connecting ends | 427 |
| section through cheese extruder outlet | 428 |
| oval cheese passage hole | 429 |
| connector Y to extruder outlet | 430 |
| hot water jacket (water source not shown) | 432 |
| flap valve | 434 |
| flap valve hangers | 436 and 437 |
| flap valve hanger seats | 438 and 439 |
| guillotine valve | 440 |
| guillotine valve hydraulic drive cylinder | 442 |
| EJECTOR | |
| ejector station | 500 |
| ejector | 502 |
| ejector fingers | 504 |
| ejector hydraulic drive cylinder | 506 |
| ejector guide wing nuts | 507 |
| ejector guide | 508 |
| ejector guide holes | 509 |
| ejector guide retainers | 510 and 512 |
| brine trough | 600 |
| brine | 602 |

FRAME COMPONENTS

The frame 102 resembles an open topped rectangular box, turned upside down, with a U-shaped saddle 104 cut out of the center of the box. Formed cheese pieces are ejected out of an extrusion mold, into which warm plastic cheese has been extruded, at the saddle. A trough 600, shown in FIG. 7, through which brine 602 is circulated, is mounted in saddle 104. The flowing brine 602 transports the formed cheese pieces away from the extruder.

Figure 1:
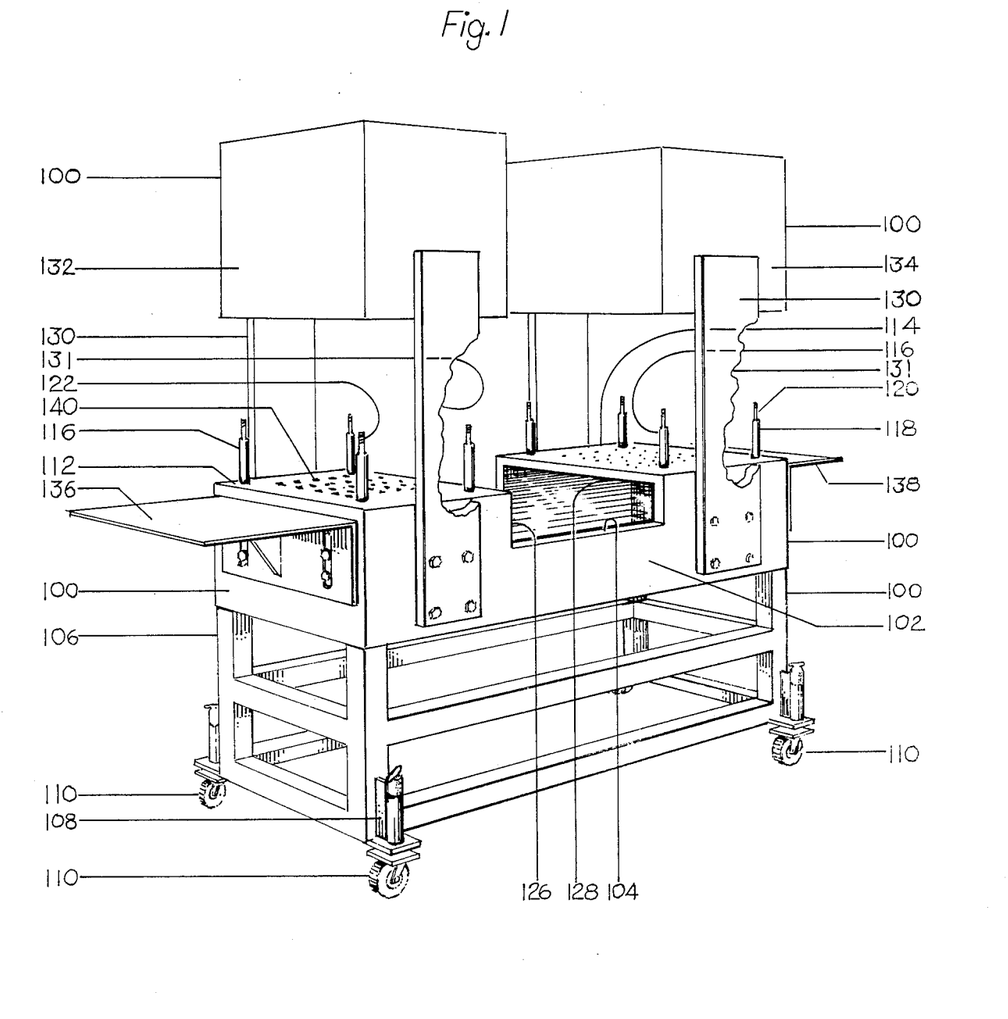
FIG. 1 is perspective view of the frame of the disassembled device, disassembled for cleaning.

As shown in FIG. 1, a figure of the disassembled device 100, frame 102 is mounted on wheeled base 106; attached by fillets 108 to the wheeled base are height adjustable wheels 110. The wheels 110 are individually adjustable to square up the device.

Frame flats 112 and 114 are the frame flat surfaces shown on either side of saddle 104. Flat 112 is on the left side of FIG. 1, flat 114 is on the right.

Near the four corners of frame flats 112 and 114 are mounted locator pins 116. There are eight locator pins, four per frame flat.

Locator pins 116 precisely position stationary members of the forming device.

As discussed further on in this specification, stationary elements of the device, including mold supports 202, weeper holes 308 in sliding support plates 306 and 307, a mold height adjustment block 300, and a cheese texturing plate 310, are placed over locator pins 116, and are indexed and located by pins 116, above and below a pair of molds 204, which are held in a reciprocating mold frame 200 and are reciprocated in an area defined by the locator pins 116 and the stationary members.

Locator pins 116 are of two diameters, one larger diameter 118, at the bottom of the pin as measured at the frame flat, and a smaller diameter 120, half way up the pin.

Figure 5:
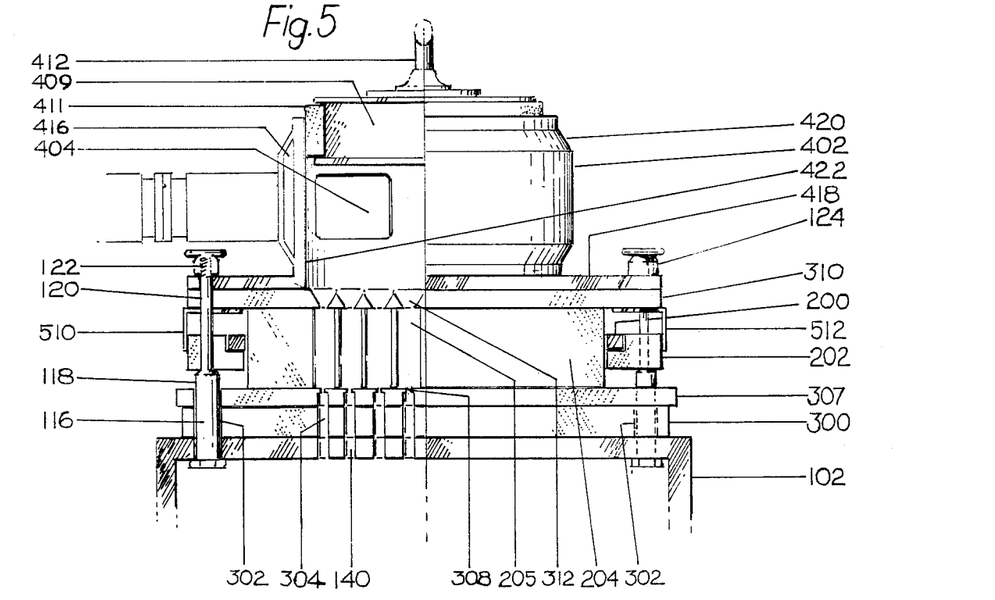
FIG. 5 is a schematic view, in partial section, of a forming station, taken from a different angle than in FIG. 4.

The top of each locator pin is threaded, 122, so the stationary elements described can be secured by wing nuts 124, best shown in FIG. 5. All of the stationary elements are easily removable from the frame for cleaning. U.S.D.A. requirements require that such a food processing device must be able to be taken completely apart for cleaning of all cheese contact surfaces, in order to obtain approval of the U.S.D.A.

As stated, the U-shaped saddle 104, at the center of frame 102, is the point of ejection of formed cheese pieces from the reciprocating molds. Clean-out openings 126 and 128, in the frame, allow cleaning under the frame flats.

FIG. 1 shows hydraulic cylinder housing support legs 130, fixed to frame 102 by four bolts. Hydraulic cylinder housings 132 and 134 are fixed to support legs 130. In this view, section 131 is taken out of each leg, to show the location of the support pins behind each leg.

FIG. 1 also shows, mounted at the ends of frame 102, adjustable sliding surface supports 136 and 138. Supports 136 and 138 are adjustable vertically. The supports, support stationary plastic support plates 306 and 307, across which the molds 204 are reciprocated. Supports 136 and 138 are adjustable up and down to allow use of molds which form cheese pieces of different heights.

Figure 4:
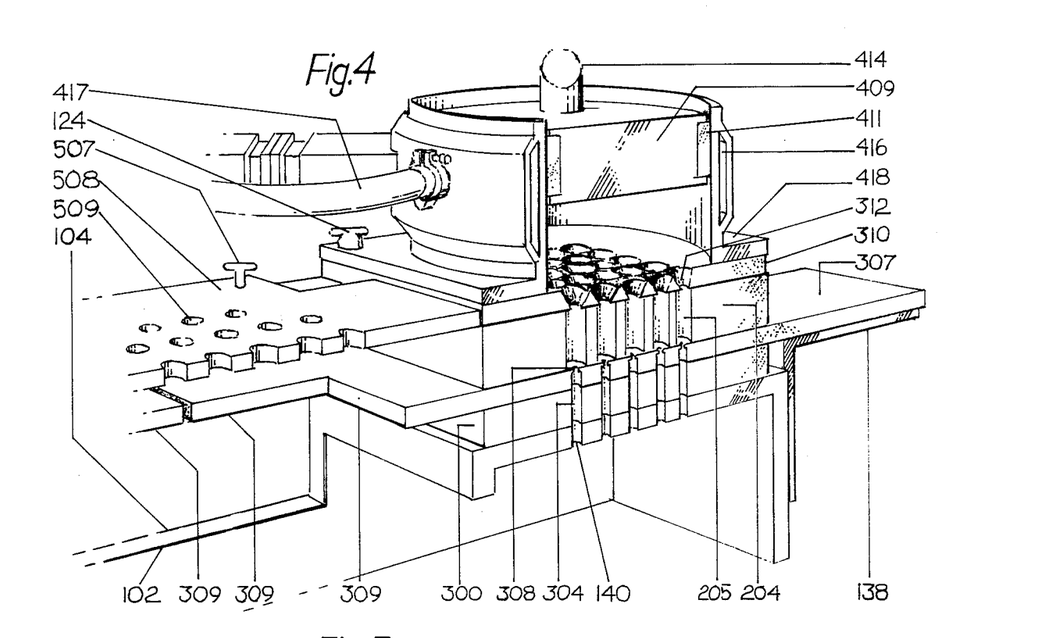
FIG. 4 is a perspective view, in partial section, of the device, detailing a forming station.
Figure 7:
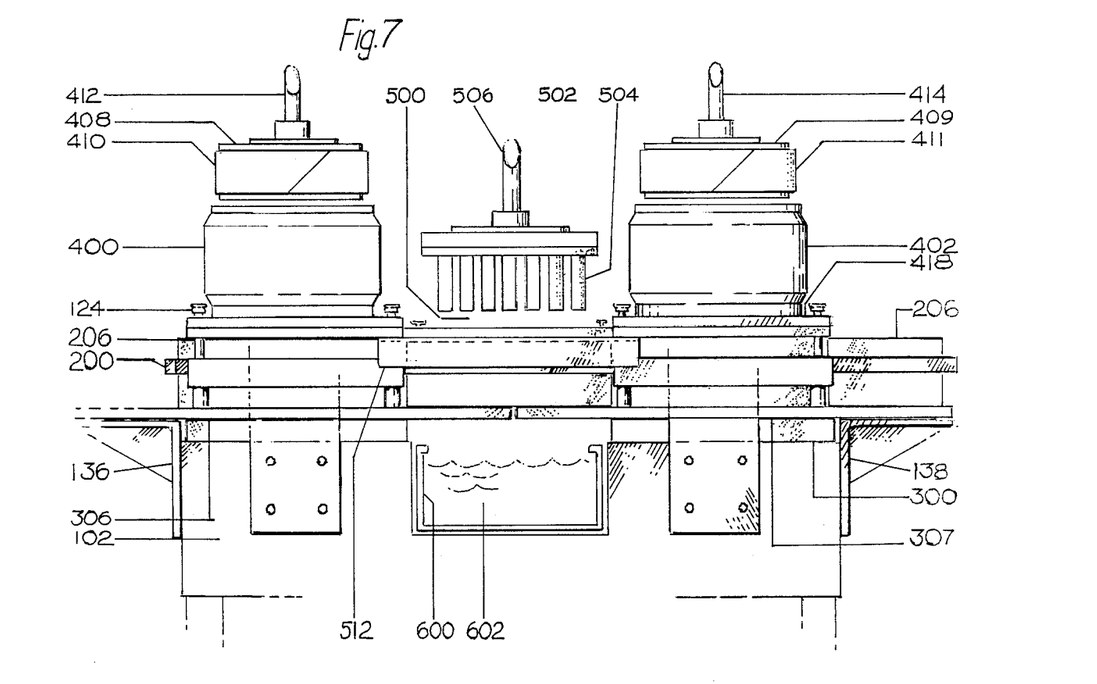
FIG. 7 is a front view of the device, in schematic, showing the forming stations and the ejector station, with the pistons and ejector raised, in cleaning position.

FIG. 7 shows supports 136 and 138 raised, to support plates 306 and 307. FIG. 4 shows the right side of the device, the height of adjustable support 138, and its operational relationship with height adjustment block 300 and plate 307.

Figure 2:
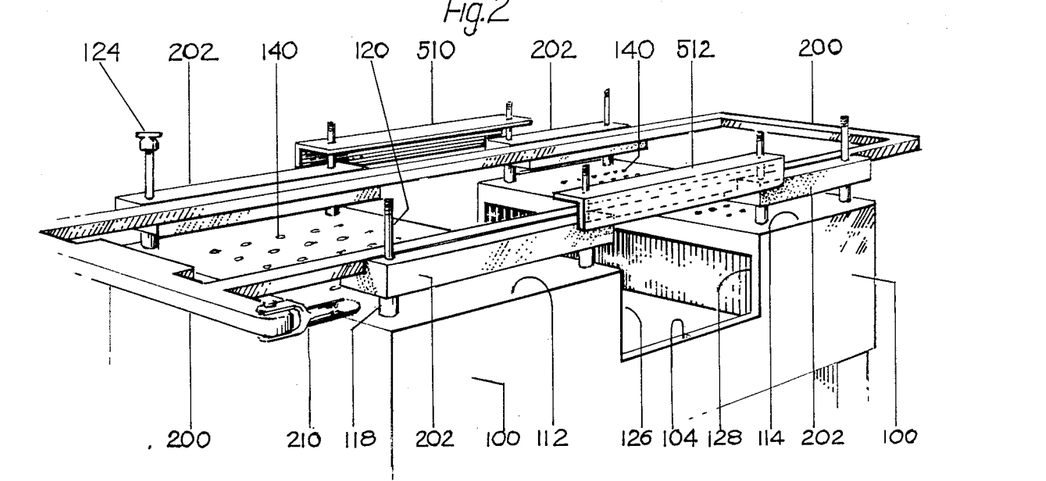
FIG. 2 is a perspective view of the disassembled device showing the reciprocating mold frame and its supports.

FIG. 2 is a perspective view of the disassembled device 100, adding the reciprocating mold frame 200, mounted on supports 202. This view is included to show the mold frame guiding and support system.

Figure 3:
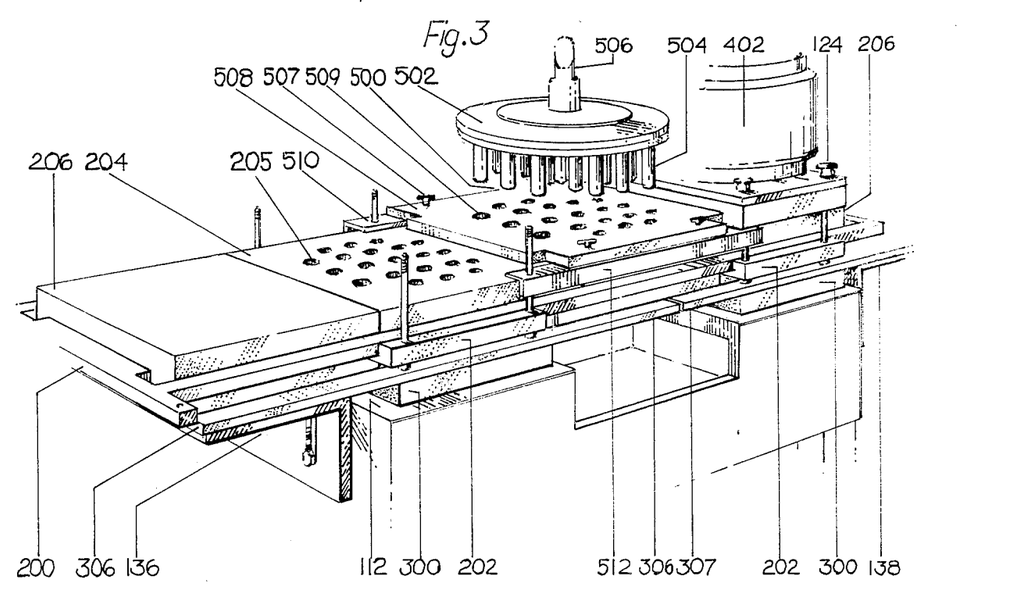
FIG. 3 is a perspective view of the device in a further stage of assembly.

As best seen in FIG. 3, molds 204 and mold blanks 206 are clamped within mold frame 200.

Figure 6:
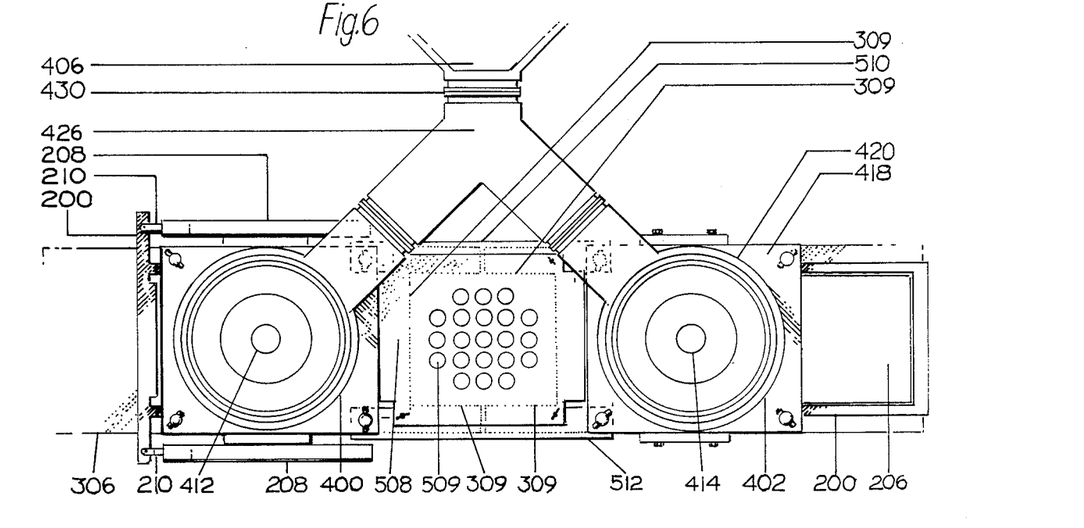
FIG. 6 is a top view of the device, in schematic, showing the layout of the extruder, the forming stations, the ejection station and the hydraulic drive for driving the reciprocating mold frame.

Mold frame 200, driven by hydraulic cylinders 208, best seen in FIG. 6, reciprocates molds 204 and blanks 206 back and forth over support plates 306 and 307, within the area defined by locator pins 116. As stated, hydraulic cylinders 208 are best seen in FIG. 6. The clevis 210 by which each cylinder 208 is connected to mold frame 200 is shown in FIG. 2. Hydraulic or air cylinders move the mold frame (200) from a mold fill position to a mold eject position.

Ejector guide retainers 510 and 512, shown in FIG. 2, are retainers for the ejector guide 508, which is mounted below the ejector 502 and above molds 204; ejector 502 and its relationship with the ejector guide 508 is best seen in FIG. 3. Ejector fingers 504 pass into ejector guide holes 509, then into the mold holes 205 forcing the cheese pieces out of mold holes 205.

Mold frame supports 202 are made of nylon. Reciprocating mold frame 200, made of stainless steel, rides on and is guided on supports 202. All other elements shown in FIG. 2 are made of stainless steel.

Frame flats 112 and 114 are shown in FIG. 2. Debris ejection holes 140 are formed in both flats. The relationship of the ejection holes 140 to the stationary elements in the device are best seen in FIG. 4 and FIG. 5, which are sections taken through forming station 402. All the holes line up with the bores 422, so that debris, such as flash from the weeper holes is cut off and falls out through the holes 140 as the molds are reciprocated.

The U-shaped saddle 104, through which formed pieces are ejected, and the clean out openings 126 and 128, used to get under frame flats 112 and 114 for cleaning are shown best in FIG. 2.

FIG. 3 is a perspective view following the format of FIG. 2. Parts of the device are added, as they would be every day, after cleaning, to reassemble the device.

Added to the partially disassembled device 100 shown in FIG. 2 are the sliding, molding, ejecting and guiding members.

As best seen in FIG. 3, within reciprocating mold frame 200, are mounted two molds, 204 and two mold blanks 206. The mold blanks 206 mounted at each end of reciprocating frame 200 are solid undrilled blocks. The undrilled blocks 206 are moved under forming stations 400 and 402 (400 is the left station) to prevent cheese from escaping as the mold block 204, is moved away from the forming station, which is being filled with warm plastic cheese under pressure from extruder 406, to a point under the ejector, at the ejector station, where the cheese pieces are forced out of the molds 204 by ejector 502. The device can be used with a single forming station. In the format shown in the drawings, two forming stations use a single ejector.

In FIG. 3, starting at frame flat 112, the left frame flat, and moving up, to explain assembly of the device, height adjustment block 300, is first placed on frame flat 112 and is retained by pins 116, passing through locator holes 302, formed through the block at the four corners of the block. The height adjustment block is used to adjust the device, so molds of different depth can be used. A shallower mold forms shorter cheese pieces. Therefore, a thicker height adjustment block is needed. In an alternate form of the device, the hydraulic cylinders are vertically adjustable or their travel is adjustable, to adjust for different size pieces.

Height adjustment block 300 has debris ejection holes 304 formed through it. The holes 304 are located at the same position, and match up with the debris ejection holes 140, formed in frame flats 112 and 114.

Next to be mounted above height adjustment block 300, on the same locator pins, are sliding support plates 306 and 307. The sliding support plates extend across and beyond the ends of both frame flats 112 and 114. This extension is best seen in FIG. 4 and FIG. 7.

The end of sliding support plate 306, where the plate extends over the end of left frame flat 112, is supported by height adjustable sliding surface support 136 as best seen in FIG. 3 and in FIG. 7. The same support is provided to sliding support plate 307 at the right flat 114 of the extruder 100 by support 138 as best seen in FIG. 4 and FIG. 7.

The top surface of support plate 306 and support plate 307 is the surface on which the reciprocating molds 204 and blanks 206 slide, while being retained by mold frame 200. A cut out 309 is made in plates 306 and 307 where they meet in the center, at the ejection station 500, so cheese pieces can be ejected. This cut-out 309 is best seen in shadow in FIG. 6 and in partial view in FIG. 4. The cut out allows the pieces to fall free into the brining transport trough.

Mold frame 200 is supported by and slides on nylon mold frame supports 202. Nylon mold frame supports 202 are best seen in FIG. 2.

At the right of FIG. 3 is a partial silhouette of one of the forming stations 402. That silhouette is included to take the viewer into FIG. 4.

FIG. 4 is a view, in section, of an assembled forming station, including a partial section of the mold guide and the frame saddle 104. FIG. 4 also shows the ejection station. FIG. 4 shows the ejection station with the mold which would be at the ejection station, removed, to show the relationship of the parts.

As in FIG. 3, FIG. 4 shows the parts of the device as assembled. This view shows the parts in detail, while clarifying the function and relationship of the parts to each other.

As an overview, this Figure shows forming station 402, cheese inlet from extruder 402, a piston or plunger 409, which forces the cheese out of the bore 422 into mold 204, mold 204 and the stationary plates that service mold 204.

Starting at frame flat 114, debris ejector holes 140 can be seen. Mounted directly on frame flat 114 is height adjustment block 300. Debris ejector holes 304, in height adjustment blocks 300 are shown.

The mold sliding support plates 306 and 307 have smaller holes, called weeper holes 308, formed in them. The holes are smaller at the top of plates 306 and 307 than the holes in frame flats 112 and 114, and are seen best in FIG. 4 and FIG. 5. The weeper holes 308 are in the form of truncated cones, with the narrow point of the truncated cone located at the mold contact surface of plates 306 and 307.

Mold 204 is shown mounted immediately above weeper holes 308. As cheese is forced into mold 204, air escapes through weeper holes 308, allowing mold 204 to fill. As mold 204 fills under pressure, a small amount of cheese, as a tail or flash, is forced out of weeper holes 308 in plate 306. The cheese tails are sheared off, when the mold is reciprocated, to drop out of the forming device 100 into a collector mounted below the frame flats 112 and 114. The collector is not shown. The pressure needed to drive the plunger greatly increases when the mold holes have been filled and further cheese can only be forced out of the much narrower weeper holes, and this pressure spike is used to shut off the power to the piston.

Above mold 204 at each forming station is mounted fixed cheese texturing plate 310. Cheese texturing plate 310 works the cheese. It gives the piece formed certain properties. Plate 310 is pierced with holes 312, that correspond to, and are aligned with mold holes 205. Holes 312 are smaller in diameter than the diameter of mold holes 205, in mold 204. Holes 312 in the fixed cheese texturing plate 310 are chamfered and are funnel-like. Cheese forced through plate 310 develops stringing properties. The overlapping chambers of the holes present sharp edges to the cheese mass being forced out of the bore into the extrusion mold. These sharp edges divide the mass in the bore into the multiple holes in the extrusion mold. That is, when the extruded cheese piece formed in the mold is pulled apart, the cheese piece pulls apart in the form of strings.

Because hole 312 is smaller in diameter than the diameter of mold holes 205, reciprocating mold 204, after it has been filled, cleanly shears off the cheese piece formed, as the mold is moved away from the forming station to the ejection station.

The device works without the cheese working plate, but produces better formed pieces with the plate. When no cheese working plate is used, the edge of the forming station cuts the mass of cheese left in the bore from the pieces formed in the extruder. The small holes in the texturing plate when used, more cleanly separate the mass of cheese in the bore from the pieces formed in the extrusion mold. A multitude of small cuts leave a more sharply defined cheese piece in the extrusion mold.

Forming stations 400 and 402 are heated cylinders. The cylinders are heated by circulation of warm water through element 417, which keeps the cheese within each cylinder plastic. Forming station 402 is the cylinder on the right side.

At the back of forming station 402, best seen in FIG. 5, can be seen a rectangular cheese entrance opening 404. Opening 404 leads from a cheese extruder 406, which pressurizes plastic cheese by means of a screw extruder, forcing the cheese into forming station 402. The pressure from the screw extruder is substantially less than the pressure placed on the cheese column by the piston.

Piston 408 and piston ring 410 are connected to hydraulic cylinder 412. Piston rings 410 and 411 are split cylinders removable from the piston for cleaning. The rings 410 and 411 are made of a stiff plastic which retains its shape in use, but is flexible enough to allow the ring to be removed from the piston for cleaning. The piston acts as a plunger in the bore formed by the inner walls 422 of the forming station, and the rings 410 and 411 act as a seal. The forming stations are shown as being cylindrical; cylindrical forming stations with piston rings are the easiest shapes to machine. A tightly fitting squared plunger, in a squared housing, has been used.

When energized, hydraulic cylinder 412, not shown, forces down piston 409, into the bore formed by inner walls 422 creating pressure on the warm plastic cheese contained in the bore in forming station 402. This pressure on the plunger (piston and ring combined) forces the plastic cheese, held within the bore of the forming station, through the cheese texturing plate 310, into mold 204, filling mold holes 205, sharply defining each piece formed in mold 204.

Figure 9:
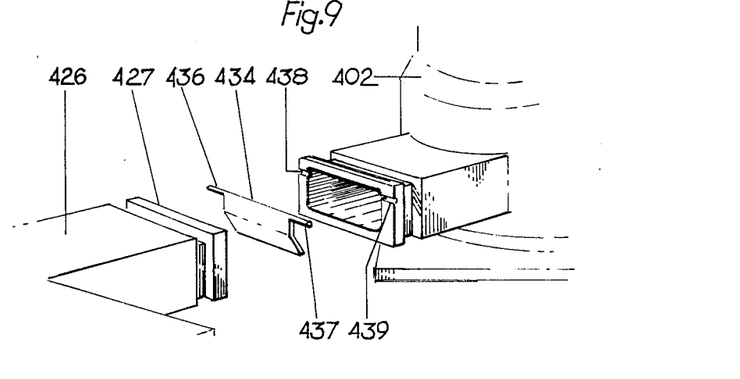
FIG. 9 is a disassembly view of the flap valve used to isolate the forming station from the extruder, when pressure is applied at the forming station.
Figure 10:
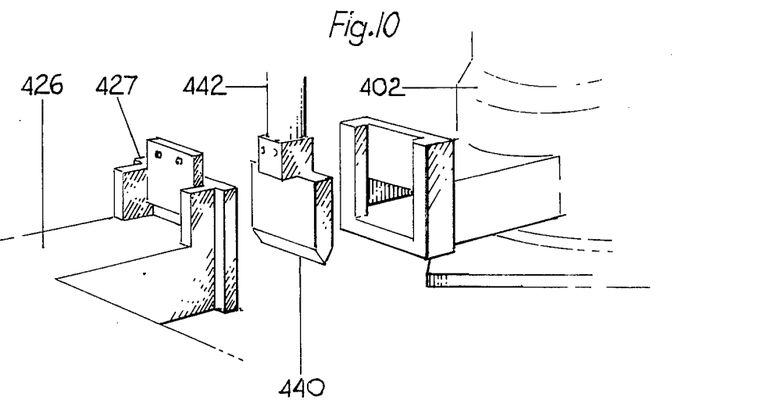
FIG. 10 is a disassembly view of a guillotine valve used to isolate the forming station from the extruder, when pressure is applied at the forming station.

The great pressure created by the energized piston 409, also forces the plastic cheese back towards cheese extruder 406. As stated, cheese extruder 406, operates at much lower pressure. Forming stations 400 and 402 must be isolated from extruder 406, when pressure is being applied by the piston. The means for isolating high pressure forming station 400 from the lower pressure extruder 406, at the time the hydraulic cylinder is energized, are shown in FIGS. 9 and 10. Those means are a guillotine valve 440 or a flap valve 434.

FIGS. 5, 6, and 7 are two dimensional schematics showing the relationship of the parts of the reciprocating mold frame forming stations and ejection station. FIG. 5 is a partial section view through forming station 402.

FIG. 5, as an overview, shows what would be the path of cheese as fed, from the extruder 406, into forming station 402. FIG. 5 shows forming station 402, internally and externally, and shows the stationary elements, a mold, and the mounting system.

Describing the elements of forming station 402, starting at the bottom of FIG. 5; frame flat 114 is shown as are locator pins 116.

The height adjustment block 300 is placed over locator pins 116. The cooperating debris ejection holes 140 in frame flat 114, and debris ejection holes in height adjustment block 300 are also shown.

Forming station retaining wing nuts 124 are shown in more detail in FIG. 5.

Forming station 402, piston 409, and removable piston ring 411 are also best shown in FIG. 5, as is hot water circulating jacket 416. At the top left of FIG. 5 can be seen the cheese entrance opening 404, leading from extruder 406. This section of FIG. 5 takes the viewer into FIG. 6 and FIG. 7, which are schematics showing positioning of the assembled device.

FIG. 6 is a two dimensional top view, showing cheese extruder 406, Y shaped separator 426, leading from extruder 406, and forming stations 400 and 402.

FIG. 6 shows the device with the hydraulic mechanism, which drives the ejector and pistons, removed to show the relationship of other elements of the device.

The elements shown in FIG. 6 are hydraulic cylinders 208 which reciprocate mold frame 200, clevis 210, connecting cylinder to mold frame 200, the mold frame 200, and ejector station 500. Ejector guide 508 is also shown.

FIG. 7 is a two dimensional front view of the assembled device.

Hydraulic cylinders 412 and 414, which drive pistons 408 and 409, up to fill position, and down to the empty position, are not shown, just the stubs of the pistons are shown. At the left of FIG. 7, piston 408, with its piston ring 410, is shown raised above the surface of forming station 400 in a third position for disassembly and cleaning. The ejector 502 is raised and is shown above ejector station 500 as is piston 409.

A trough 600 of flowing brine 602 is mounted in saddle 104. As cheese pieces are ejected from mold 204, by mold fingers 504 pressing into mold holes 205, the cheese pieces drop into and are carried away from device 100, by the flowing brine 602, to a processing station.

Figure 8:
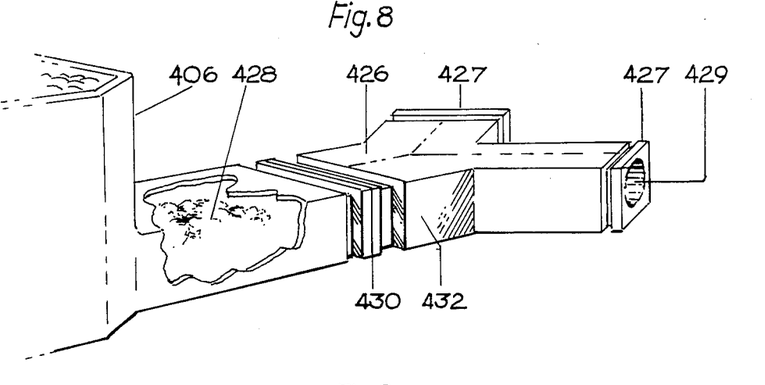
FIG. 8 is a perspective view of the device, showing cheese feed from the extruder to a Y-divider, which separates the output of the extruder into two columns feeding cheese into each of the forming stations.

FIG. 8 is a perspective view of outlet 428, from cheese extruder 406, to the branching Y 426, which feeds plastic cheese to forming stations 400 and 402.

At the connecting ends 427, of Y 426, where the Y, is attached to forming station, the inside of the Y is oval shaped 429 to eliminate bacteria growth areas, which would be formed by square surfaces. Hot water flows through a jacket on Y 426, to keep the cheese within the Y, plastic.

FIG. 9 shows the preferred flap valve 434 that is used to isolate forming station 400 from extruder 406. Hangers 436 and 437 extend from flap valve 434 and ride in hanger seats 438 and 439. Valve 434 swings freely in the seats until cheese is forced into the system. Valve 434 swings forward as cheese is extruded into the forming station, and does not interfere with cheese flow from extruder towards forming station.

As piston 408 or 409 is forced down, cheese is forced first, both into mold 204, and back towards low pressure extruder 406, because of the much higher pressure used at forming stations 400 and 402.

Flap valve 434 is forced backwards, as the cheese is forced back towards the extruder, to its valve seat, as pressure is raised in forming station 400 or 402, isolating forming station 400 or 402 from extruder 406. Pressure in the forming station then rapidly increases after valve 434 seats, forcing the plastic cheese into mold 204. When the mold 204 is full, cheese can only be extruded through the weeper holes 308. Because the amount of force necessary to force cheese through the small weeper holes is very high, pressure starts to greatly increase at the forming stations. When that great increase is detected by a pressure switch, the hydraulic cylinder driving the piston is deenergized, and the piston is reversed to fill position as the filled mold is reciprocated into eject position.

FIG. 10 shows an alternate isolation method which uses a guillotine valve 440. With that valving system, as the hydraulic cylinder 412 driving the piston 408 into the forming station is engaged, a second cylinder 442 is also engaged. The second hydraulic cylinder 442 drives the guillotine valve down into its seat; forcing the guillotine valve 440 down into its seat blocks the Y 426, at extruder 406.

The system in FIG. 9 is a more elegant solution to the required isolation and requires fewer connections and fewer openings for cheese to extrude out of the system as pressure is placed on the cheese column by the descending piston.

Centrally located between frame flats 112 and 114 is ejection station 500, best seen in FIGS. 3, 4 and 7.

A filled mold 204 is reciprocated under ejector 502; ejector 502 is an assembly of ejector fingers 504, which correspond to and are aligned with the holes in mold 204. The ejector 502 is attached to an ejector hydraulic cylinder 506, which when energized, forces ejector 502 down.

Ejector guide 508, mounted below ejector 502 by retainers 510 and 512, is best seen in FIG. 2. Ejector fingers 504, are held slightly above chamfered holes in ejector guide 508. When the ejector hydraulic cylinder 506 is energized, the ejector 502 is forced down, guide 508 ensures that the fingers 504 of the ejector 502 match up with holes 205 in the mold 204.

In an alternate system, an air injection device, not shown is forced down against mold 204. An air outlet is located above each mold hole 205. Injection of air forces the formed cheese piece out of each mold hole 205 into the flowing brine 602.

Pneumatic cylinders can be used instead of the hydraulic cylinders cited as can other means such as solenoids.

In operation, the piston or plunger is raised in the bore into a first position. At that position, warm plastic cheese extrudes into the bore, filling the bore from the forming plate at the bottom of the bore to the piston blocking the top of the bore.

The piston drive cylinder is then energized driving the piston from the first bore fill position to the second bore empty position.

As the piston moves down through the bore, the cheese in the bore is forced down and back toward the extruder; a valve isolates the extruder from the bore and the bore contents are forced through the texturing plate into the extrusion mold.

The mold fills and cheese begins to be extruded out of the weeper holes. At this point when the pressure spikes or when desired piston travel has been attained, the cylinder driving the piston is de-energized and the piston withdrawn to its first bore fill position.

The mold is slid out of its mold fill position, to a mold eject position. That movement shears off the tail at the weeper holes and shears off the pieces formed in the mold from the mass in the bore at the cheese texturing plate holes.

At the eject position, a single ejector, centrally mounted, in the best method, ejects the formed cheese into a brine transport trough.

In the best method, the device shown, which uses a single center ejector, servicing two forming stations, a four inch bore, 11 inch stroke hydraulic cylinder, generally operating at 600 psi up to 1000 psi, using food grade hydraulic fluid is used for each piston.

The centrally mounted ejector is driven by a 1 and ½ inch bore, 9 inch stroke hydraulic cylinder operating at 750 psi. The mold frame is operated by 2 hydraulic cylinders with a flow divider, the cylinders are 1½ inch bore and 16 inch stroke.

The flap valve used in the device swings through an arc of approximately 2 and ½ inches.

The spacer plates are made of UHMW plastic. The weeper plate of acetyl plastic. The mold is made of UHMW plastic.

I claim:

1. A cheese piece forming device comprising:
 a bore in the shape of a hollow cylinder;
 a plunger slidably mounted within said bore, slidable from a first bore fill position to a second bore empty position; movement of said plunger within the bore of said hollow cylinder, defining a swept volume within the cylinder;
 a cheese inlet port, formed through said hollow cylinder, into said swept volume;
 a mold, in sliding engagement with said hollow cylinder, mounted below the hollow cylinder; the plane of reciprocation of said mold being normal to the longitudinal axis of the hollow cylinder; said mold being reciprocal from a first mold fill position wherein said mold is positioned under the bore to a second mold eject position, wherein said mold is positioned under an ejector;
 said mold having a plurality of forming chambers formed therethrough; said forming chambers extending from the top surface of the mold to the bottom surface thereof; said mold operable when positioned under the hollow cylinder to block off the hollow cylinder except for the forming chambers;
 means for reciprocating said mold from said mold fill position to said mold eject position;
 a cheese extruder operable to deliver warm, plastic, cheese under pressure to the swept volume;
 means connecting the output of the cheese extruder through the cheese inlet port into the swept volume;
 fluid power means, connected to the piston, operable, when energized, to force the piston from said first bore fill position, through to said bore empty position, thereby extruding cheese out of the swept volume of the hollow cylinder, into the forming chambers in the extrusion mold;
 a valve mounted between the hollow cylinder and the extruder, operable when energized, to isolate said swept volume of the hollow cylinder from the extruder;
 ejection means operable to force the cheese pieces formed out of said mold when said mold is in said mold eject position.

2. The device in claim 1 further comprising:
 a cheese texturing plate mounted below the bore, above the mold, in sliding engagement with said mold; said cheese texturing plate having a plurality of holes formed therethrough, matching and in alignment with the holes in the mold, when said mold is in mold fill position; said holes being formed in the shape of truncated cones, the smaller surface of the cone, located at the bottom of said cheese texturing plate in sliding engagement with said mold.

3. The device in claim 1 wherein the valve operable when energized to isolate said swept volume of the hollow cylinder from the extruded is mounted within the means connecting the output of the cheese extruder to the swept volume.

4. A frame, said frame having an opening formed therethrough;
 a pair of frame flats formed on said frame, said frame flats formed on either side of said opening, each of said frame flats having a plurality of debris ejection holes formed therethrough;
 a sliding support surface, mounted on each frame flat, each of said sliding support surfaces having a plurality of weeper holes formed therethrough;
 a mold frame slidably mounted on said sliding support surface, for reciprocal motion of said mold frame, between a first mold fill position and a second mold eject position;
 a pair of extrusion molds mounted within said mold frame; said extrusion molds having a plurality or cheese piece forming holes formed therethrough; said molds being in sliding engagement with said sliding support surface;
 a pair of mold blanks mounted within said mold frame; said mold blanks being in sliding engagement with said sliding support surface;
 means for reciprocating said molds over said sliding support surface, from a first mold fill position to a second mold eject position;
 a housing, having a bore formed therethrough, mounted above the mold frame, the longitudinal axis of said bore being normal to the plane in which the mold frame is reciprocated;
 a piston slidably mounted within said bore, said piston forming a plunger in said bore; said piston slidable from a first bore fill position to a second bore empty position; said piston forming a volume open at one end, between the piston and the housing; said housing having a cheese inlet formed therethrough, into said bore;
 a cheese working plate having a plurality of holes formed therethrough, said holes being shaped in the form of truncated cones, mounted below said bore;
 a source of warm plastic cheese under pressure, comprising a cheese extruder, operable when energized, to deliver warm plastic cheese under pressure, to said cheese inlet and into said bore;
 a pipe connecting the output of the cheese extruder to the inlet;
 fluid power means operable to drive said piston from said first bore fill position to said second bore empty position, to extrude cheese out of the bore, in the housing, through said holes in said cheese working plate, into said extrusion mold and into the weeper holes;
 a valve operable to isolate the extruder from the bore when said fluid power means is energized;
 a single means operable to force the cheese pieces out of the extrusion mold at said frame opening.

5. A cheese piece forming device comprising:
 a frame;
 a frame flat on said frame, said frame flat having a plurality of debris ejection holes formed therethrough;

a support plate mounted on said frame flat; said support plate having a plurality of weeper holes formed therethrough;

a forming station mounted above said support plate and spaced apart therefrom; said forming station having a cheese entrance opening formed therethrough; said forming station having a bore formed therethrough;

a first bore fill position within said bore;

a second bore empty position within said bore;

a piston movably mounted within said bore; said piston movable from said first bore fill position to said second bore empty position through a swept volume, within said bore;

a first fluid power cylinder coupled to said piston, operable when energized to drive the piston, within the bore, from said first bore fill position, to said second bore empty position;

a slidably mounted mold frame;

a mold mounted within the mold frame; said mold having a plurality of cheese piece forming holes formed therethrough;

a mold blank mounted within the mold frame;

a fist mold frame, mold fill position, wherein said debris ejection holes, said weeper holes and said mold holes are in fluid flow relation with the bore;

a second mold frame, mold eject position wherein said mold is positioned under an ejector;

a second fluid power cylinder coupled to said mold frame, operable, when energized, to reciprocate said mold from said first mold frame, mold fill position, wherein said mold is positioned under the bore, to said second mold frame, mold empty position wherein said mold blank is positioned under the bore and said mold is positioned under an ejector;

a source of warm plastic cheese under pressure, comprising a cheese extruder connected in fluid flow relationship, to the bore, through said cheese entrance opening; whereby cheese extruded under pressure out of said cheese extruder is formed into said bore;

a valve operable, when energized, to isolate the cheese in the bore from the cheese in the extruder when the first fluid power cylinder is energized;

an ejector;

ejector drive means operable when energized to eject cheese pieces formed in the mold, out of the mold, when said mold is positioned under the ejector.

6. A cheese piece forming device comprising:

A frame;

a frame flat on said frame, said frame flat having a plurality of debris ejection holes formed therethrough;

a support plate supported by said frame flat; said support plate having a plurality of weeper holes formed therethrough;

a forming station said forming station mounted above and spaced apart from said support plate; said forming station having a bore formed therethrough; said forming station having a cheese entrance opening formed therethrough to said bore;

a cheese texturing plate having a plurality of holes formed therethrough, mounted below said forming station; said cheese texturing plate blocking off one end of said bore;

a plunger slidably mounted within said bore, blocking off the other end of said bore;

a first plunger, bore fill position, within said bore;

a second plunger, bore empty position, within said bore;

said plunger being slidably from said first bore fill position to said second bore empty position;

a first fluid power cylinder coupled to said plunger, operable when energized, to reciprocate the plunger, within the bore, between said first bore fill position and said second bore empty position;

a mold slidably mounted on said support plate in sliding engagement with said cheese texturing plate; said mold having a plurality of cheese piece forming holes formed therethrough;

a first mold fill position wherein said mold is position under said cheese texturing plate;

a second mold eject position, wherein said mold is positioned under said ejector;

said mold slidable between said first mold fill position and said mold eject position;

said bore formed through the forming station, said cheese texturing plate holes, said cheese piece forming holes formed in said mold, said weeper holes formed in the support plate and said debris ejection holes formed in the frame, being in fluid flow relation, when said mold is in said first mold fill position, whereby when said first fluid power cylinder is energized, forcing said plunger form first bore fill position to said second bore empty position, at least part of the contents of the bore are forced by said piston through said cheese texturing plate, into said mold, partly through said weeper holes and out said debris ejection holes;

a second fluid power cylinder coupled to said mold, operable when energized to reciprocated said mold between said first mold fill position and aid second mold eject position;

a source of warm, plastic cheese under pressure, comprising a cheese extruder connected in fluid flow relationship to the cheese entrance opening; whereby cheese extruded under pressure from said cheese extruder, is forced into said bore through said cheese entrance opening;

a valve operable when energized, to isolate the cheese in the bore, from the cheese in the extruder, when said first fluid power cylinder, connected to the plunger, is energized;

ejector drive means coupled to said ejector, operable when energize, to force the cheese pieces formed in the mold out of the mold, when the mold is positioned under the ejector.

* * * * *